US011511722B2

(12) United States Patent
Boehm et al.

(10) Patent No.: US 11,511,722 B2
(45) Date of Patent: Nov. 29, 2022

(54) ELECTROMECHANICAL BRAKE PRESSURE GENERATOR INCLUDING A THREADED DRIVE SYSTEM AND VEHICLE INCLUDING AN ELECTROMECHANICAL BRAKE PRESSURE GENERATOR

(71) Applicant: Robert Bosch GmbH, Stuttgart (DE)

(72) Inventors: Mark Boehm, Lehrensteinsfeld (DE); Sebastian Martin Reichert, Affaltrach (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 16/854,332

(22) Filed: Apr. 21, 2020

(65) Prior Publication Data

US 2020/0339091 A1 Oct. 29, 2020

(30) Foreign Application Priority Data

Apr. 25, 2019 (DE) .......................... 102019205911.2

(51) Int. Cl.
*F16H 25/24* (2006.01)
*B60T 13/74* (2006.01)
(Continued)

(52) U.S. Cl.
CPC .......... *B60T 13/745* (2013.01); *B60T 13/161* (2013.01); *B60T 17/08* (2013.01); *F16H 25/20* (2013.01); *F16H 2025/2081* (2013.01)

(58) Field of Classification Search
CPC ........ B60T 13/12; B60T 13/74; B60T 13/161; B60T 13/745; B60T 13/746; F16H 25/20; F16H 25/24
(Continued)

(56) References Cited

U.S. PATENT DOCUMENTS 3,994,207 A * 11/1976 Ekdahl .................. B60T 17/085
92/29
4,063,491 A * 12/1977 Roger .................... B60T 17/086
188/170
(Continued)

FOREIGN PATENT DOCUMENTS

GB 1420724 * 1/1976 ............. F16D 65/32
WO 2017045804 A1 3/2017
WO 2017089008 A1 6/2017

*Primary Examiner* — Christopher P Schwartz
(74) *Attorney, Agent, or Firm* — Norton Rose Fulbright US LLP; Gerard Messina

(57) ABSTRACT

An electromechanical brake pressure generator for a hydraulic braking system of a vehicle, including a threaded drive system for converting a drive-side rotary motion into a translatory motion for brake pressure generation. The system includes a spindle rotatable via an electric motor, a spindle nut cooperating with a thread of the spindle so the spindle nut is axially displaceable with a rotation of the spindle and a brake fluid is loadable or relievable, and a housing which, together with the spindle nut, forms an anti-twist protection which secures the spindle nut against twisting during rotation of the spindle. The spindle nut forms at least one spindle nut reference surface, which cooperates with at least one stop surface, which is stationary with respect to the housing, in a relief end position of the spindle nut in such a way that an instantaneous axial position of the spindle nut is determinable therefrom.

13 Claims, 2 Drawing Sheets

(51) Int. Cl.
  *B60T 13/16* (2006.01)
  *F16H 25/20* (2006.01)
  *B60T 17/08* (2006.01)
(58) Field of Classification Search
  USPC ................ 188/152, 170, 129, 134; 74/89.31
  See application file for complete search history.

(56) References Cited

U.S. PATENT DOCUMENTS

| | | | | |
|---|---|---|---|---|
| 2020/0339090 | A1* | 10/2020 | Boehm | .................... F16H 25/24 |
| 2020/0340560 | A1* | 10/2020 | Oehler | .................. B60T 13/745 |
| 2020/0340563 | A1* | 10/2020 | Boehm | .................... B60T 7/042 |
| 2021/0018079 | A1* | 1/2021 | Winkler | ................ B60T 13/168 |
| 2021/0197784 | A1* | 7/2021 | Drumm | ............... F16H 25/2015 |

* cited by examiner

ELECTROMECHANICAL BRAKE PRESSURE GENERATOR INCLUDING A THREADED DRIVE SYSTEM AND VEHICLE INCLUDING AN ELECTROMECHANICAL BRAKE PRESSURE GENERATOR

CROSS REFERENCE

The present application claims the benefit under 35 U.S.C. § 119 of German Patent Application No. DE 102019205911.2 filed on Apr. 25, 2019, which is expressly incorporated herein by reference in its entirety.

FIELD

The present invention relates to an electromechanical brake pressure generator and to a vehicle including an electromechanical brake pressure generator.

The electromechanical brake pressure generator may also be used as a brake booster in which an input braking force is boosted. The electromechanical brake pressure generator or the brake booster includes, in particular, a threaded drive system for converting a drive-side rotary motion into a translatory motion for the brake pressure generation or the brake boost.

For the sake of simplicity, reference is only made to a brake pressure generator hereafter.

BACKGROUND INFORMATION

The foot force of the driver is mostly not sufficient for braking passenger cars, so that these are usually equipped with a brake booster. Brake boosters in general frequently operate with the aid of a vacuum generated by the internal combustion engine. The pressure difference between the engine pressure and the ambient pressure is used in the process to apply a boosting force onto the piston rod of the piston/cylinder unit, in addition to the foot force of the driver.

Alternative brake pressure buildup devices are needed for future drive concepts of motor vehicles since a vacuum is no longer available to operate a conventional vacuum brake booster.

For this purpose, the electromechanical brake pressure generators of interest here were developed.

The actuating force is generated in the process on the piston/cylinder unit with the aid of an electric motor. Such electromechanical brake pressure generators may not only be used to provide an auxiliary force, but in brake by wire systems also to single-handedly provide the actuating force. Electromechanical brake pressure generators are thus of advantage, in particular, with respect to autonomous driving.

A conventional electromechanical brake booster is described in PCT Application No. WO 2017/045804 A1, which is shown in FIG. 1. In contrast, the present invention is also directed to an electromechanical brake pressure generator which is able to apply a braking force independently of an actuation of the brake pedal. The conventional brake booster 1 includes a spindle nut 2 and an electric motor (not shown), whose operation may be used to make spindle nut 2 carry out a rotation via a spur gear 3. Spindle nut 2 is present in an operatively engaged state with a spindle 4, which is why spindle 4 may be made to carry out a translatory motion along its spindle axis 5 with the aid of spindle nut 2 made to carry out the rotation. To prevent spindle 4 from co-rotating as a result of the rotation of spindle nut 2, brake booster 1 includes a bearing system 6 to which spindle 4 is fixedly connected.

Bearing system 6 includes a bracket 6a, on the edges of which two sliding bearings 6b are situated. Sliding bearings 6b run on tie rods 7 which extend essentially in parallel to spindle axis 5. Spindle 4 is movable in the axial direction with the aid of this bearing system 6 and is secured against twisting.

A hydraulic vehicle braking system including an electromechanical brake pressure generator is described in PCT Application No. WO 2017/089008 A1, which as an external force generator generates a braking force at which the brake cylinder actuatable by muscle power serves only as a setpoint generator for the electromechanical brake pressure generator. The electromechanical brake pressure generator may thus also be activated independently of the brake cylinder actuatable by muscle power, so that a brake application is possible also in an autonomous driving state.

SUMMARY

The present invention provides an electromechanical brake pressure generator for a hydraulic braking system of a vehicle. The electromechanical brake pressure generator includes at least one threaded drive system for converting a drive-side rotary motion into a translatory motion for the brake pressure generation. The threaded drive system includes a spindle rotatable with the aid of an electric motor as a drive, a spindle nut cooperating with a thread of the spindle so that the spindle nut is axially displaceable with a rotation of the spindle and a brake fluid is loadable or relievable, and a housing which, together with the spindle nut, forms an anti-twist protection which secures the spindle nut against twisting during a rotation of the spindle.

A threaded drive system within the scope of the present invention shall be understood to mean both a pure spindle drive, in which the spindle nut is in direct contact with the spindle, and a ball screw. A ball screw is a helical gear including balls inserted between the spindle and the spindle nut. Both parts have a helical groove, which together form a helical tube filled with balls. The form-locked connection in the thread transversely to the helical line does not take place between the thread groove and tongue, as is the case with the pure spindle drive, but with the aid of balls.

A loading of the brake fluid shall be understood to mean that a movement of the spindle nut in the direction of the brake fluid results in a loading or a pressurization of the brake fluid, whereby it is delivered further. A relieving of the brake fluid shall accordingly be understood to mean that the spindle nut moves in a direction in which it moves away from the brake fluid, whereby it is relieved. This means that a pressure acting on the brake fluid is reduced.

According to the present invention, the spindle nut forms at least one spindle nut reference surface, which cooperates with at least one stop surface, which is stationary with respect to the housing, in a relief end position of the spindle nut in such a way that an instantaneous axial position of the spindle nut, for example in the form of a zero position, is determinable therefrom.

A spindle nut reference surface within the meaning of the present invention is a surface provided on the spindle nut which is specifically designed for this purpose, and whose position at the spindle nut is stored to be able to determine the axial position of the spindle nut thereby. A stop surface which is stationary with respect to the housing is designed accordingly. This stop surface is non-displaceable relative to the housing during operation. The stop surface is also specifically designed for this purpose, and its position in the housing is also stored for determining the axial position of the spindle nut.

The relief end position is the position in a relief direction which is situated at an axial end in this direction. This position is known, so that the zero point of the spindle nut may be re-calibrated when the spindle nut moves thereagainst. This is necessary, in particular, after a restart. This is also necessary with respect to a possible wear in a spindle nut thread, so that the exact instantaneous position of the spindle nut is determinable.

In one preferred embodiment of the present invention, the spindle is rotatably mounted with respect to the housing with the aid of a bearing, the bearing forming the stop surface for the spindle nut. As a result of the bearing, a stop surface may thus be formed in a simple manner.

In one further preferred embodiment of the present invention, the anti-twist protection is formed by a torque support which engages in a groove of the housing, the torque support forming the spindle nut reference surface, and an axial end of the nut forming the stop surface. The torque support thus strikes directly against the housing. The resulting forces and moments during a strike against the stop surface thus do not need to be transmitted via further components, whereby damage may possibly occur on these components. As a result of the strike against the housing, furthermore a very precise position with respect to the housing is achieved since a short tolerance chain is present. In addition, a robust stop surface is formed by the housing, and the number of the additionally required components is thus also minimal.

The spindle nut is preferably made up of a plastic material. A plastic material has the advantage that it is less expensive and lighter compared to metal and considerably easier to manufacture, for example by way of injection molding. As a result of the plastic material, moreover a spindle nut reference surface may be formed in a simple manner, which emits considerably less noise compared to metal when striking against the stop surface. In addition, a material which has good sliding properties with the spindle and which has low wear may be selected for the spindle nut. In this way, in particular, the friction may be considerably reduced when running dry.

The use of a spindle nut made up of plastic also reduces the noise during operation. The plastic additionally generates a damping effect, so that pressure peaks or moment peaks are cushioned or damped, and the load on an upstream gearbox is decreased. As a result, the service life of an upstream gearbox may be extended.

As an alternative, the spindle nut is made up of a metal alloy. The metal alloy allows a spindle nut to be formed which has a high strength and a long service life.

The spindle nut reference surface is advantageously integrated into the spindle nut. For example, the spindle nut reference surface may be formed by the spindle nut itself or by an additional component which is joined to the spindle nut during the injection molding process. In this way, the number of components to be installed into the threaded drive system is reduced.

In one further advantageous embodiment of the present invention, the spindle nut reference surface and/or the stop surface is/are designed to be damping. For this purpose, for example, an additional damping element in the form of a rubber buffer, for example, may be situated at the corresponding spindle nut reference surface or on the stop surface. In this way, the noise development is additionally reduced. In addition, the components are protected even better against potential damage during the movement against the stop surface.

According to one advantageous embodiment, the spindle nut reference surface and/or the stop surface is/are designed to be resilient. For this purpose, for example, a spring element may be situated at the corresponding surfaces. This spring element may be situated as a separate part, or a resilient effect may be achieved by an appropriate shaping. This spring element also significantly reduces the noise development. In addition, the durability of the components is improved.

The present invention furthermore provides a vehicle including an example electromechanical brake pressure generator for a hydraulic braking system. Such a vehicle allows the advantages described with respect to the electromechanical brake pressure generator to be achieved. In one preferred embodiment, this vehicle may be an automated or completely autonomous vehicle.

Exemplary embodiments of the present invention are shown in the figures and are described in greater detail below.

DETAILED DESCRIPTION OF EXAMPLE EMBODIMENTS

Figure 1:
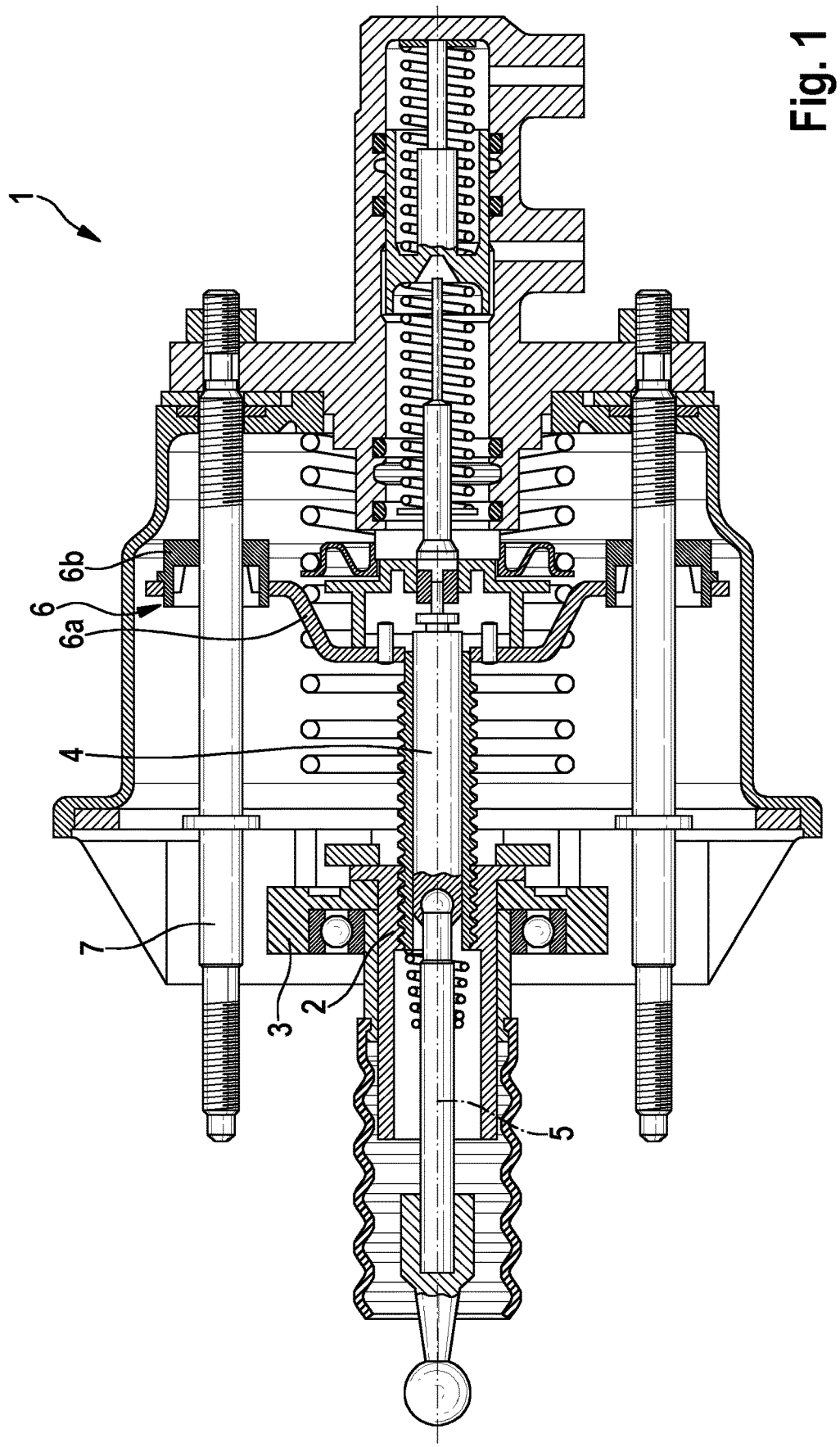
FIG. 1 shows an illustration of a conventional electromechanical brake booster from the related art.
Figure 2:
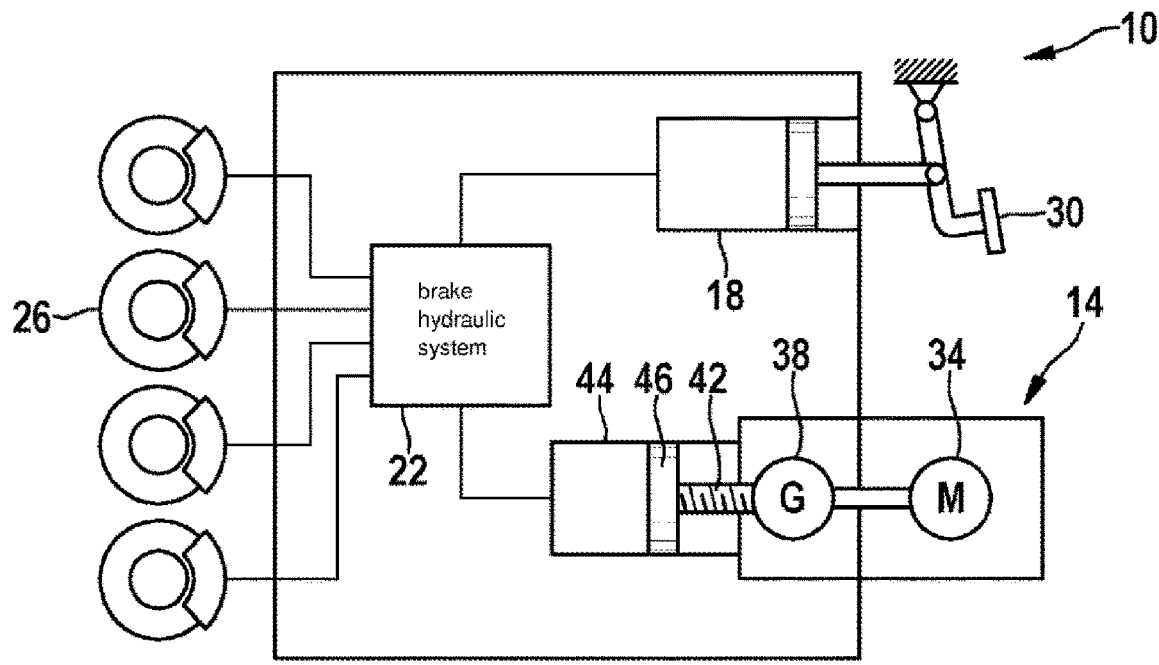
FIG. 2 shows a simplified schematic representation of a conventional hydraulic braking system from the related art for a vehicle including an electromechanical brake pressure generator.

FIG. 2 shows a simplified schematic representation of a conventional hydraulic braking system 10 from the related art for a vehicle including an electromechanical brake pressure generator 14. Hydraulic braking system 10 includes electromechanical brake pressure generator 14 and a piston/cylinder unit 18. Piston/cylinder unit 18 and electromechanical brake pressure generator 14 are both hydraulically connected to a brake hydraulic system 22, which is only shown as a box here.

Brake hydraulic system 22 is formed by various valves and other components for forming a, for example, electronic stability program (ESP). To be able to decelerate the vehicle, brake hydraulic system 22 is additionally connected to at least one wheel brake unit 26 so that a braking force may be applied to wheel brake unit 26 by a corresponding switching of valves.

Piston/cylinder unit 18 is actuated by muscle power with the aid of a brake pedal 30. In contrast, the braking force of electromechanical brake pressure generator 14 is generated with the aid of an electric motor 34. For this purpose, electric motor 34 is connected to a gearbox 38, with the aid of which threaded drive system 42 is driven. Threaded drive system 42 is connected to a hydraulic piston 46 situated in a hydraulic cylinder 44 so that a brake pressure is generatable.

Figure 3:
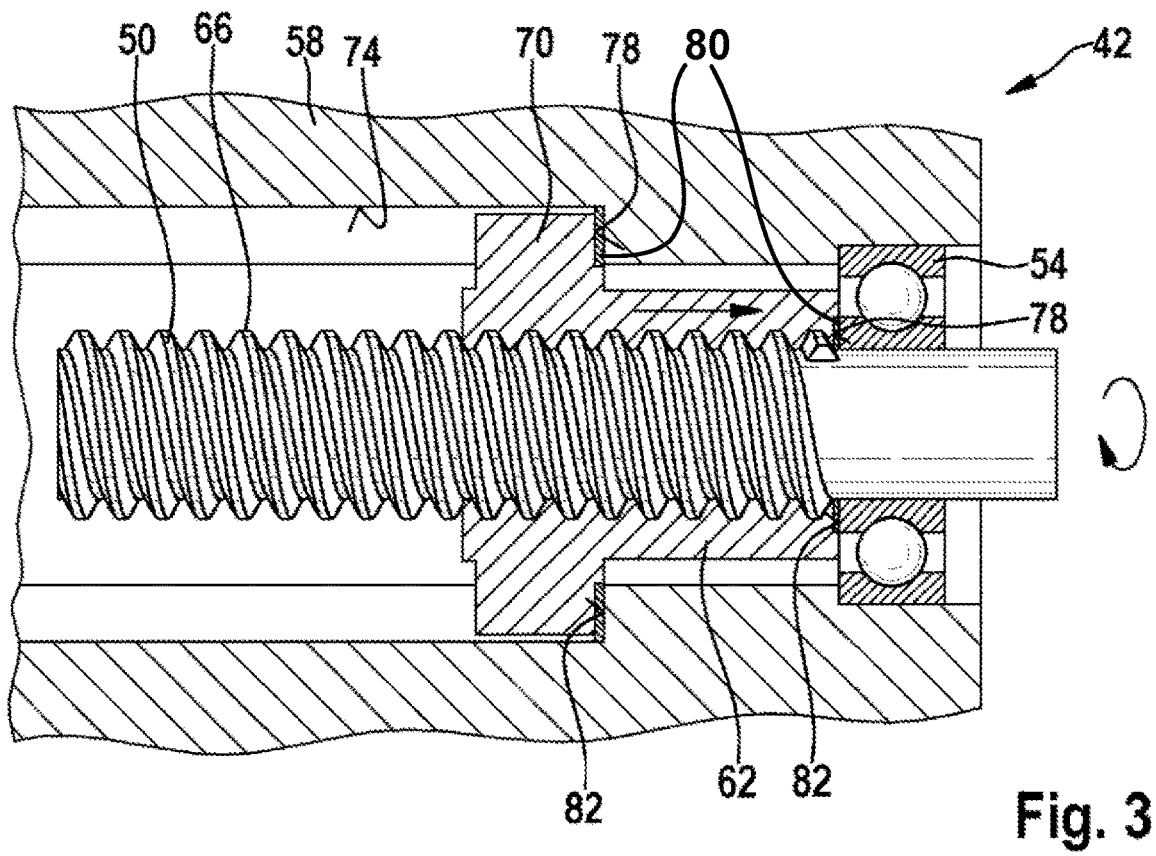
FIG. 3 shows a longitudinal sectional view of one exemplary embodiment of a threaded drive system for an electromechanical brake pressure generator.

FIG. 3 shows a longitudinal sectional view of one exemplary embodiment of a threaded drive system 42 for an electromechanical brake pressure generator 14. Electromechanical brake pressure generator 14 according to the present invention including threaded drive system 42 may be used in hydraulic braking system 10 shown in FIG. 2. Threaded drive system 42 includes a spindle 50, which is rotatable with the aid of electric motor 34. With the aid of a bearing 54, which is situated in an area of an axial end of spindle 50, spindle 50 is rotatably mounted with respect to a housing 58 of threaded drive system 42. Bearing 54 is fixedly connected to housing 58 in the process.

Threaded drive system 42 additionally includes a spindle nut 62, which cooperates with a thread 66 of spindle 50 so that spindle nut 62 is axially displaceable with a rotation of spindle 50. In the shown exemplary embodiment, spindle nut 62 is formed of a plastic material. Spindle 50 additionally forms two radially extending torque supports 70. Torque supports 70 engage in corresponding grooves 74 of housing 58, which are designed as longitudinal grooves. Together, torque supports 70 and grooves 74 form an anti-twist protection for spindle nut 62 so that it does not co-rotate with a rotation of spindle 50.

Spindle nut 62 furthermore forms spindle nut reference surfaces 78. In the example shown here, spindle nut 62 includes spindle nut reference surfaces 78 at torque supports 70 and at an axial end face of spindle nut 62, spindle nut reference surfaces 78 being situated in a direction of a relief end position. The relief end position is characterized in that, in this position, a smallest possible pressurization of the brake fluid by the position of spindle nut 62 is present. Spindle nut 62 shown in FIG. 3 is in this relief end position. In this exemplary embodiment, spindle nut reference surfaces 78 formed at spindle nut 62 are integrated into spindle nut 62.

Matching spindle nut reference surfaces 78 on torque supports 70, stop surfaces 82 for spindle nut 62 are formed in housing 58 at an axial end of groove 74. Additionally, in this exemplary embodiment, further stop surfaces 82 are situated at bearing 54, matching spindle nut reference surfaces 78 on the axial end face of spindle nut 62. As a result of spindle nut reference surfaces 78 and stop surfaces 82, spindle nut 62 may be moved into the relief end position. The achievement of the relief end position is detected, so that the instantaneous position of spindle nut 62 is determinable with the aid of the defined relief end position and is storable. In an example embodiment, the spindle nut reference surface and/or the stop surface includes a layer 80 that provides damping, for example by being formed as a rubber buffer or provides resiliency by being formed as a spring element.

What is claimed is:

1. An electromechanical brake pressure generator for a hydraulic braking system of a vehicle, comprising:
   at least one threaded drive system configured to convert a drive-side rotary motion into a translatory motion; and
   a piston/cylinder unit actuatable by the threaded drive system for brake pressure generation;
   wherein:
      the threaded drive system includes:
         a spindle which is rotatable via an electric motor as a drive;
         a spindle nut which cooperates with a thread of the spindle so that the spindle nut is axially displaced with a rotation of the spindle in a first direction towards a brake fluid to thereby pressurize the brake fluid and in a second direction, that is opposite the first direction, towards a relief end position of the spindle nut to reduce a pressure of the brake fluid; and
         a housing;
      the housing and the spindle nut are structured to cooperate with each other to secure against a twisting of the spindle nut during a rotation of the spindle; and
      the spindle nut forms at least one spindle nut reference surface which cooperates with at least one stop surface, which is stationary with respect to the housing, in the relief end position of the spindle nut.

2. The electromechanical brake pressure generator as recited in claim 1, wherein the spindle is rotatably mounted with respect to the housing using a bearing, the bearing forming the stop surface for the spindle nut.

3. The electromechanical brake pressure generator as recited in claim 1, wherein the anti-twist protection is formed by a torque support which engages in a groove of the housing, the torque support forming the spindle nut reference surface, and an axial end of the nut forming the stop surface.

4. The electromechanical brake pressure generator as recited in claim 1, wherein the spindle nut is made of a plastic material.

5. The electromechanical brake pressure generator as recited in claim 1, wherein the spindle nut is made of a metal alloy.

6. The electromechanical brake pressure generator as recited in claim 1, wherein the spindle nut reference surface is integrated into the spindle nut.

7. The electromechanical brake pressure generator as recited in claim 1, wherein the spindle nut reference surface and/or the stop surface is configured as a damping surface.

8. The electromechanical brake pressure generator as recited in claim 7, wherein the damping surface includes rubber.

9. The electromechanical brake pressure generator as recited in claim 1, wherein the spindle nut reference surface and/or the stop surface is resilient.

10. The electromechanical brake pressure generator as recited in claim 1, wherein the electromechanical brake pressure generator is configured to calibrate axial positioning of the spindle nut by positioning of the spindle nut in the relief end position of the spindle nut.

11. A vehicle, comprising:
   a hydraulic braking system; and
   an electromechanical brake pressure generator for the hydraulic braking system, the electromechanical brake pressure generator including:
      at least one threaded drive system configured to convert a drive-side rotary motion into a translatory motion;
      a piston/cylinder unit actuatable by the threaded drive system for brake pressure generation;
   wherein:
      the threaded drive system includes:
         a spindle which is rotatable via an electric motor as a drive;
         a spindle nut which cooperates with a thread of the spindle so that the spindle nut is axially displaced with a rotation of the spindle in a first direction towards a brake fluid to thereby pressurize the brake fluid and in a second direction, that is opposite the first direction, towards a relief end position of the spindle nut to reduce a pressure of the brake fluid; and
         a housing:
      the housing and the spindle nut are structured to cooperate with each other to secure against a twisting of the spindle nut during a rotation of the spindle; and the spindle nut forms at least one spindle nut reference surface which cooperates with at least one stop surface, which is stationary with respect to the housing, in the relief end position of the spindle nut.

12. The vehicle as recited in claim 11, wherein the electromechanical brake pressure generator is configured to calibrate axial positioning of the spindle nut by positioning of the spindle nut in the relief end position of the spindle nut.

13. The electromechanical brake pressure generator as recited in claim 12, wherein:
- the electromechanical brake pressure generator stores an identification of a position of (a) the at least one spindle nut reference surface and/or (b) the at least one stop surface; and
- the calibration is performed based on the stored identification.

* * * * *